UNITED STATES PATENT OFFICE.

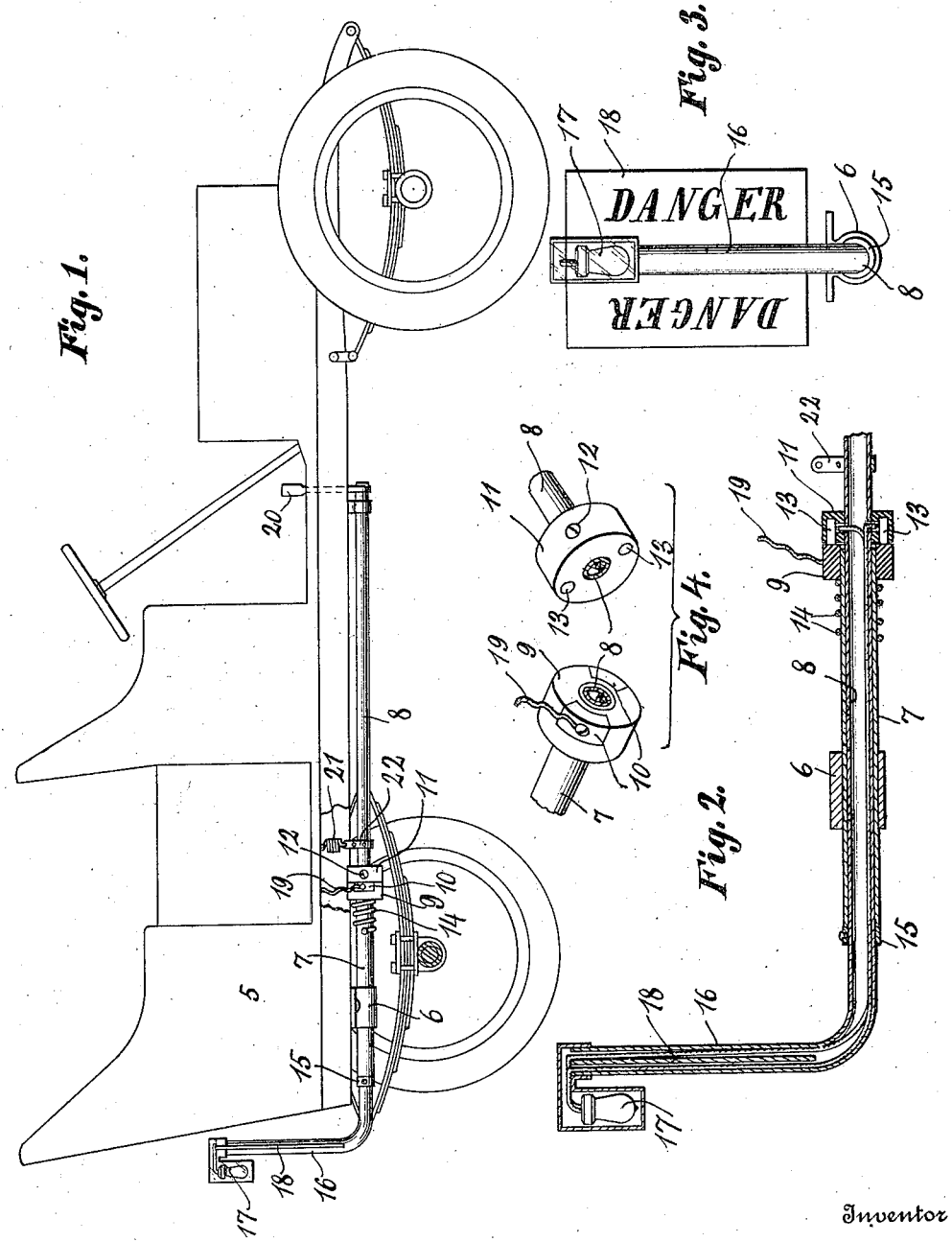

FRANK B. MILLS, OF CHICAGO, ILLINOIS.

STEERING-INDICATOR.

1,044,901.  Specification of Letters Patent.  Patented Nov. 19, 1912.

Application filed February 7, 1912. Serial No. 676,075.

*To all whom it may concern:*

Be it known that I, FRANK B. MILLS, a citizen of the United States, residing at Chicago, in the county of Cook and State of Illinois, have invented certain new and useful Improvements in Steering-Indicators, of which the following is a specification.

This invention relates to steering indicators for automobiles and other vehicles, the device being designed to indicate the direction in which the driver is about to turn the wheels, so as to serve as a warning to another vehicle following behind, and thus avoid a collision.

It is the object of the invention to provide a device of the kind stated which is simple in construction, easily operated, and efficient and reliable in operation.

The invention is illustrated in the accompanying drawing forming a part of this specification, in which drawing, Figure 1 is a side elevation showing the application of the invention. Fig. 2 is a longitudinal section of the device. Fig. 3 is a rear elevation. Fig. 4 is a perspective view of the circuit-controlling device separated.

Referring specifically to the drawing, 5 denotes the body of an automobile or other vehicle. To the bottom of said body, at its rear end, is secured, by means of a suitable bracket 6, a tubular member 7, in which latter is mounted, so as to be free to rock therein, a tubular shaft 8, said parts extending in the direction of the length of the vehicle. On the forward end of the member 7 is slidably mounted a disk 9 of insulation having embedded in one of its faces two diametrically opposite contacts 10. The shaft 8 projects from this end of the member 7 and carries a disk 11 of insulation which is made fast to the shaft by a screw or other suitable means 12. This disk is located adjacent to the disk 9 and has one of its faces contiguous to that face of said disk 9 carrying the contacts 10, and provided with diametrically opposite contacts 13. The disk 9 is yieldingly held against the disk 11 by a coiled spring 14, one end of which is fastened to the member 7 and its other end pressing against the rear face of the disk 9. The rear end of the shaft 8 projects from the corresponding end of the member 7 and carries a set collar 15 which abuts against said end of the member 7, said collar, in conjunction with the disk 11, preventing longitudinal movement of the shaft 8 relative to the member 7.

The rear end of the shaft 8 terminates in an upward bend 16 behind the back of the body 5, and carries a light 17, which latter may be an ordinary incandescent lamp, the current wires of which are inclosed in the shaft 8, and connected to the contacts 13. The bend 16 also carries a target 18 projecting laterally from both sides thereof. Upon rocking the shaft 8, the bend 16 is swung in a vertical plane, transversely of the vehicle, and the light and the target may therefore be swung over to the right or the left to indicate the direction the vehicle is about to turn. Normally, the target is in vertical position, the same indicating that the vehicle is going straight ahead. If a turn is to be made, the target will be swung down into horizontal position, either to the right or the left, according to the direction the vehicle is going to turn.

The contacts 10 and 13 are so arranged that the circuit is broken when the bend 16 is in vertical position, but when the shaft 8 is rocked to swing the target and lamp to the right or to the left, said contacts come together and thus close the circuit to turn on the lamp. To the contacts 10 are connected conductors 19 leading from a suitable current source.

The forward end of the shaft 8 extends to the corresponding end of the vehicle, and is provided with a suitable operating lever 20, within reach of the driver.

A spring 21, secured at one end to the bottom of the body 5, and at its other end to a clamp 22 fastened to the shaft 8, serves to hold the bend 16 normally in vertical position, the action of the lever 20 being against said spring in either direction, so that the spring restores the parts to their normal position after the signal has been given.

I claim:

1. The combination with a vehicle, of a support thereon, a rock shaft carried by the support, a set collar on the shaft and engageable with one end of the support, an insulating disk on the shaft adjacent to the other end of the support, contacts on the disk, an insulation disk on the support and having contacts, resilient means for holding the last mentioned disk in contact with the first mentioned disk, the contacts of said disks being on their contiguous faces and normally out of engagement, and an electric signal device carried by the shaft and normally in vertical position, said signal device swinging transversely of the vehicle when the shaft is rocked.

2. The combination with a vehicle, of a support, a rock shaft carried by the support, an insulating disk on the shaft, contacts on the disk, an insulation disk on the support and having contacts, resilient means for holding the last mentioned disk in contact with the first mentioned disk, the contacts of said disks being on their contiguous faces and normally out of engagement, and an electric signal device carried by the shaft and normally in vertical position, said signal device swinging transversely of the vehicle when the shaft is rocked.

In testimony whereof I affix my signature in presence of two witnesses.

FRANK B. MILLS.

Witnesses:
 HORTON MILLS,
 H. G. BATCHELOR.

Copies of this patent may be obtained for five cents each, by addressing the "Commissioner of Patents, Washington, D. C."